United States Patent
Bi et al.

(10) Patent No.: US 9,948,351 B2
(45) Date of Patent: Apr. 17, 2018

(54) SHORT RANGE RADIO COMMUNICATION DEVICE AND A METHOD OF CONTROLLING A SHORT RANGE RADIO COMMUNICATION DEVICE

(71) Applicant: INTEL IP CORPORATION, Santa Clara, CA (US)

(72) Inventors: Dongsheng Bi, Fremont, CA (US); Hakan Magnus Eriksson, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 102 days.

(21) Appl. No.: 15/200,159

(22) Filed: Jul. 1, 2016

(65) Prior Publication Data

US 2018/0006681 A1    Jan. 4, 2018

(51) Int. Cl.
    H04B 1/7143    (2011.01)
    H04W 4/00      (2018.01)
    H04L 7/00      (2006.01)
    H04W 84/20     (2009.01)

(52) U.S. Cl.
    CPC ......... *H04B 1/7143* (2013.01); *H04L 7/0008* (2013.01); *H04W 4/008* (2013.01); *H04W 84/20* (2013.01)

(58) Field of Classification Search
    CPC ...... H04L 5/14; H04L 2012/5608; H04J 1/10; H04B 7/2045; H04B 7/208; H04B 7/2621
    USPC .................................. 370/281, 295, 319, 344
    See application file for complete search history.

(56) References Cited

U.S. PATENT DOCUMENTS

| | | | |
|---|---|---|---|
| 6,519,460 B1* | 2/2003 | Haartsen | H04B 1/715 370/330 |
| 6,590,928 B1* | 7/2003 | Haartsen | H04B 1/7143 375/134 |
| 2004/0221046 A1* | 11/2004 | Heinonen | H04W 88/08 709/227 |
| 2005/0090200 A1 | 4/2005 | Karaoguz et al. | |
| 2007/0206660 A1 | 9/2007 | Lifchuk | |

OTHER PUBLICATIONS

Zhifeng Jiang et al., "Reducing Collisions between Bluetooth Piconets by Orthogonal Hop Set Partitioning", 2003, pp. 229-232, IEEE.
The extended European search report based on Application No. 17177982.0 (10 Pages) dated Oct. 30, 2017 (Reference Purpose Only).

* cited by examiner

*Primary Examiner* — Brenda H Pham
(74) *Attorney, Agent, or Firm* — Viering, Jentschura & Partner mbB

(57) ABSTRACT

A short range radio communication device and a method of controlling a short range radio communication device may include a processing circuit configured to: determine a time offset between an initial starting point of operation of a transceiver in accordance with a first frequency hopping sequence and a shifted starting point of operation of the transceiver in accordance with the first frequency hopping sequence so that a first segment of a frequency range is exclusive of a second segment of the frequency range; and control at least one of a controller and a clock circuit to operate the transceiver in accordance with the first frequency hopping sequence at the shifted starting point.

20 Claims, 6 Drawing Sheets

FIG. 5

510 — Determine a time offset between an initial starting point of operation of the transceiver in accordance with the first frequency hopping sequence and a shifted starting point of the operation of the transceiver in accordance with the first frequency hopping sequence so that the first segment is exclusive of the second segment 520 — Control at least one of the controller and the clock circuit to operate the transceiver in accordance with the first frequency hopping sequence at the shifted starting point

SHORT RANGE RADIO COMMUNICATION DEVICE AND A METHOD OF CONTROLLING A SHORT RANGE RADIO COMMUNICATION DEVICE

TECHNICAL FIELD

Various aspects of this disclosure relate generally to a short range radio communication device and a method of controlling a short range radio communication device.

BACKGROUND

With the increasing popularity of smartphones and wearables, there are more and more short range radio communication devices, e.g., Bluetooth devices, around us. With the increasing number of these devices around, the likelihood of scatternet scenarios also increases, in which, for example, a single device may serve as a slave of one piconet and a master of another piconet.

In a conventional scatternet scenario, the two piconets operate independently on their own respective piconet clocks and frequency hopping sequences. As the two respective piconet clocks are free running and not synchronized, the drift over time will result in communications traffic of the two piconets colliding with one another. During these collisions, time conflicts (a conflict to serve a master role or a slave role at the same time) and frequency conflicts (different piconets transmitting and receiving data on the same frequency channel) may occur. The time conflicts are addressed on an ad-hoc basis depending on the instantaneous priorities, however, this approach has its limitations and does not address frequency conflicts.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a block diagram of a method of controlling a short range radio communication device.

DESCRIPTION

Figure 1:
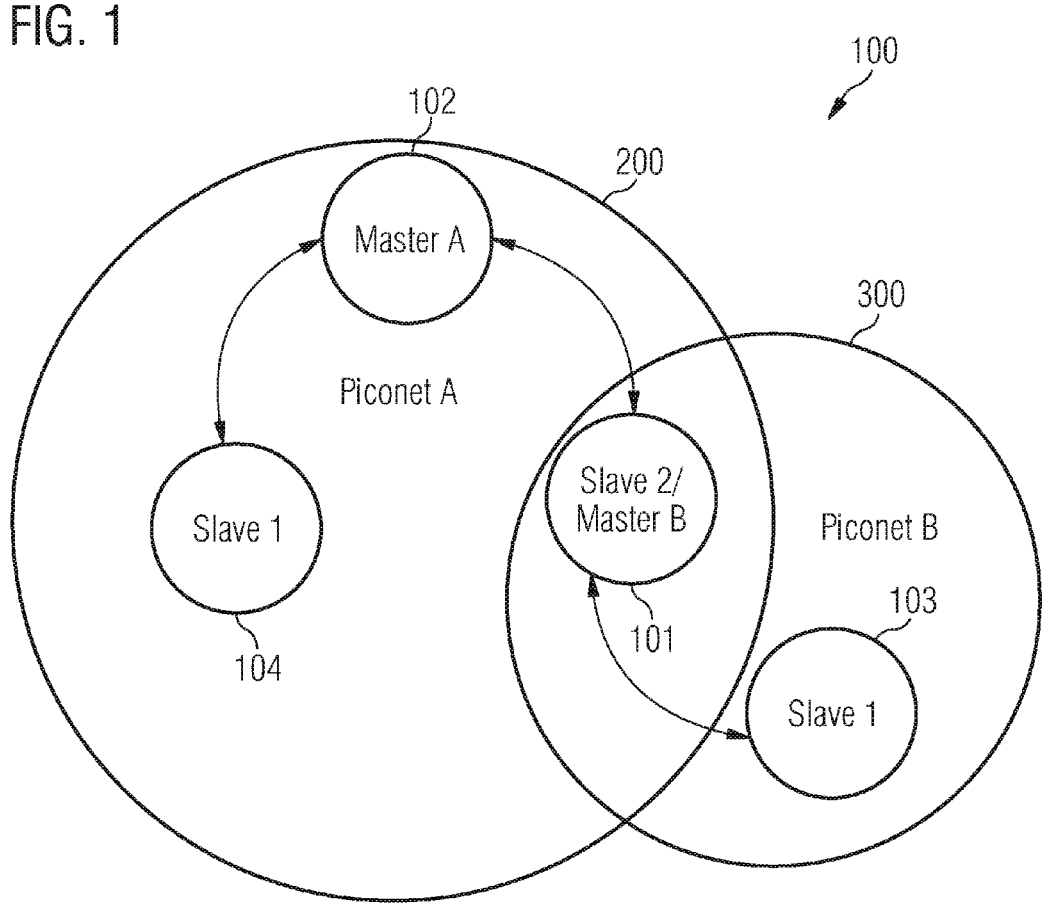
FIG. 1 shows a scatternet scenario.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as, for example, Java. Any other kind of implementation of the respective functions which will be described in more detail below may also be understood as a "circuit". It is understood that any two (or more) of the described circuits may be combined into a single circuit with substantially equivalent functionality, and, conversely, that any single described circuit may be distributed into two (or more) separate circuits with substantially equivalent functionality. In particular with respect to the use of "circuitry" in the Claims included herein, the use of "circuit" may be understood as collectively referring to two or more circuits.

A "processing circuit" (or equivalently, "processing circuitry") as used herein, is understood as referring to any circuit that performs an operation(s) on signal(s), such as, e.g., any circuit that performs processing on an electrical signal or an optical signal. A processing circuit may thus refer to any analog or digital circuitry that alters a characteristic or property of an electrical or optical signal, which may include analog data, digital data, or a combination thereof. A processing circuit may thus refer to an analog circuit (explicitly referred to as "analog processing circuit (ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g., a processor or microprocessor). As utilized herein, "digital processing circuit(ry)" may refer to a circuit implemented using digital logic that performs processing on a signal, e.g., an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit (s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory". It is appreciated that a single component referred to as "memory" or "a memory" may be composed of more than one different type of memory, and thus may refer to a collective component including one or more types of memory. It is readily understood that any single memory component may be separate multiple collectively equivalent memory components, and vice versa. Furthermore, it is appreciated that while memory may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated the ensuing description may detail exemplary scenarios involving a mobile communications device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

FIG. 1 may show a first short range radio communication device 101 (i.e., a short range radio communication device 101) in a scatternet scenario 100. In this exemplary scatternet scenario 100, there may be two networks, network 200 (or piconet A) and network 300 (or piconet B), i.e., network 200 and network 300 may be piconets, e.g., Bluetooth piconets. A single network may support up to eight active short range radio communication devices, and may support more inactive short range radio communications devices. Network 200 may consist of first short range radio communication device 101, which may be in a slave role (slave 2) to second short range radio communication device 102 (i.e., a master short range radio communication device 102), which is in a master role of network 200. Fourth short range radio communication device 104 may also be in a slave role to second short range radio communication device 102. Network 300 may include first short range radio communication device 101 in a master role to third short range radio communication device 103 (i.e., a slave short range radio communication device 103). First short range radio communication device 101 may be in a scatternet scenario.

For example, a personal computer (PC), e.g., first short range radio communication device 101, may be the master of a human interaction device (HID), e.g., third short range radio communication device 103, such as a mouse, and may also serve a slave role to an audio headset, e.g., second short range radio communication device 102. The headset may be the master of its own piconet and may have a cellular mobile communications device, e.g., fourth short range radio communication device 104, such as a mobile cellular phone, serving in a slave role. Between the headset and PC may be an ongoing hands-free profile (HFP) connection for a voice over internet protocol (VoIP) connection. The HID may actively connect with the PC at the same time as the headset. Both the headset and HID communications are periodic with the PC. Traffic from the two networks may periodically collide with each other if unsynchronized, which may cause interference of packet delivery or reception.

The clocks of network 200 and network 300 may be synchronized according to, e.g., the piconet adjustment feature (see Specification of the Bluetooth System Covered Core Package Version 4.2, Bluetooth SIG, Dec. 2, 2014, herein incorporated by reference in its entirety). However, by synchronizing the clocks, collisions may still occur, as may be seen in FIG. 2.

Figure 2:
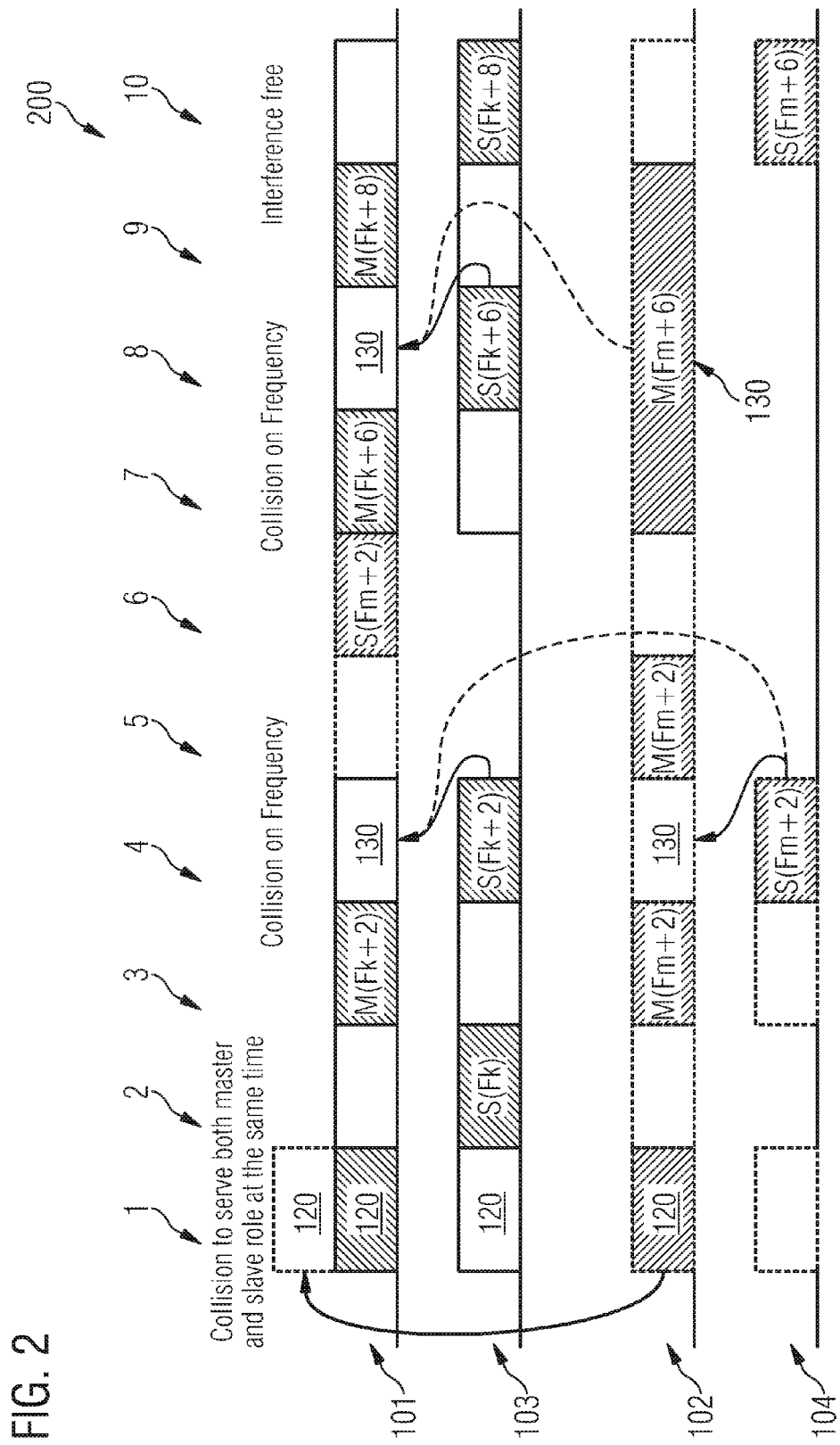
FIG. 2 shows collisions of packets in time and frequency in a scatternet scenario.

FIG. 2 may show a scatternet scenario 200 that illustrates collisions of packets in time and frequency. Boxes indicated by 1-10 may be exemplary time slots, e.g., each time slot may be 625 μs, as in accordance with the Bluetooth specifications. Each row may represent respective communications for first short range radio communication device 101, second short range radio communication device 102, third short range radio communication device 103, and fourth short range radio communication device 104. Second short range radio communication device 102, fourth short range radio communication device 104, and first short range radio communication device 101 may form network 200, while, first short range radio communication device 101 and third short range radio communication device 103 may form network 300.

Time slot 1 may be a master communication time slot, i.e., the master, here, for example, second short range radio communication device 102, may communicate with a slave device, e.g., first short range radio communication device 101 or fourth short range radio communication device 104. Time slot 2 may be a slave communication time slot. The slave addressed in time slot 1 may communication with the master in time slot 2. In an aspect of the disclosure, time slot 1 and time slot 2 may perform communications on the same frequency channel, e.g., an adapted piconet physical channel according to Bluetooth communications specifications. This pattern may continue for the other exemplary time slots, however, for each pair of time slots, the frequency channel may hop to the next frequency channel in the sequence. In another aspect of the disclosure, the frequency channel may be different for each time slot according to the frequency hopping sequence.

Time slots 7-9 from second short range radio communication device 102 to fourth short range radio communication device 104 may be a multislot packet that may occur on the same frequency channel. Likewise, time slot 10 from fourth short range radio communication device 104 to second short range radio communication device 102 may also occur on the same frequency channel. The following time slots may return to the appropriate frequency channel of the frequency hopping sequence (i.e., skipping over the channel frequencies scheduled for time slots 9 and 10).

Time collision time slots 120 in time slot 1 may illustrate a collision where first short range radio communication device 101 may be scheduled to operate in the master role and in the slave role for the respective networks 200 and 300. In a conventional scatternet scenario, this time collision would be dealt with in an ad hoc manner, e.g., based on the priority of the respective communications, wherein one of the communications would have superior priority. This type of collision may decrease data throughput.

Frequency collision time slots 130 in time slots 4 and 8 (as seen from first short range radio communication device 101), may illustrate a collision where first short range radio communication device 101 may be scheduled to receive a communication from its slave, third short range radio communication device 103, and second short range radio communication device 102 may be scheduled to simultaneously receive a communication from fourth short range radio communication device 104. The two communications may be on the same frequency channel (according to their respective pseudo-random frequency hopping sequences), which may lead to interference of the reception of both packets. Note there is no frequency collision in time slot 9 as network 300 has advanced to the next channel frequency, whereas second short range radio communication device 102 is transmitting a multislot packet and is still transmitting on the frequency channel for time slots 7 and 8. A frequency collision may also decrease data throughput.

Figure 3:
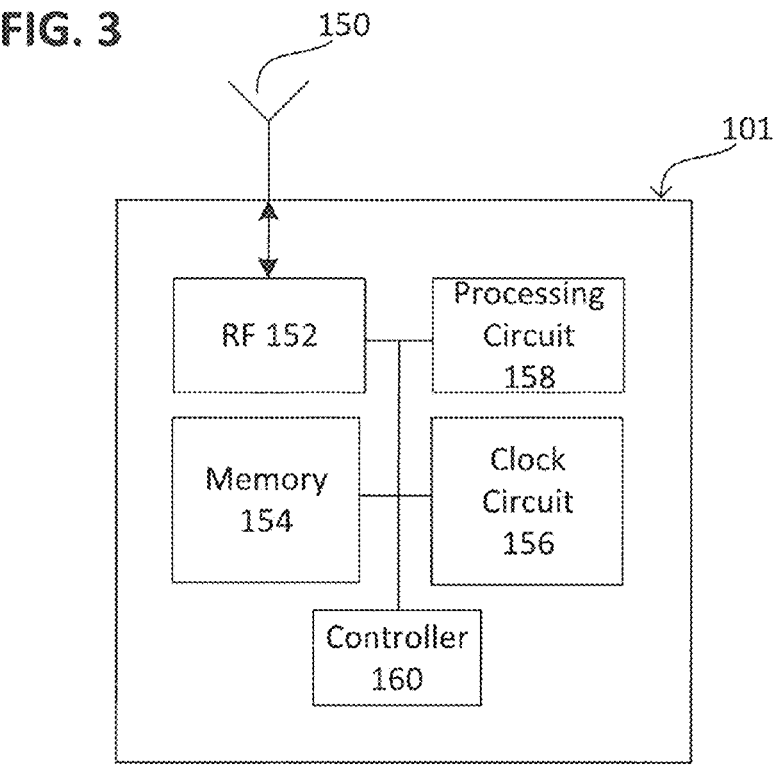
FIG. 3 shows a short range radio communications device.

FIG. 3 may show a block diagram of first short range radio communication device 101. First short range radio device 101 may include antenna 150, radio frequency (RF) transceiver 152, memory 154, clock circuit 156, processing circuit 158, and controller 160. Processing circuit 158 may be configured to: determine a time offset between an initial starting point of operation of the RF transceiver 152 in accordance with a first frequency hopping sequence and a shifted starting point of the operation of the RF transceiver 152 in accordance with the first frequency hopping sequence so that a first segment of a frequency range is exclusive of a second segment of the frequency range; and control at least one of the controller 160 and the clock circuit 156 to operate the RF transceiver 152 in accordance with the first frequency hopping sequence at the shifted starting point.

Antenna 150 may be composed of one or more dedicated or shared antennas, e.g., antenna 150 may be an antenna array. Antenna 150 may receive wireless radio frequency signals, transduce the wireless radio frequency signals to generate electrical radio frequency signals, and provide the electrical radio frequency signals to RF transceiver 152. RF transceiver 152 may also provide electrical radio frequency signals to antenna 150, which antenna 150 may transduce and transmit as wireless radio frequency signals. Such antenna reception/transmission and RF reception/transmission/modulation/demodulation operations will be appreciated by those of skill in the art.

Processing circuit 158 may act as a control circuit of first short range radio communication device 101, e.g., by controlling RF transceiver 152 to transmit and receive short range radio signals, e.g., Bluetooth signals in accordance with Bluetooth communications specifications. Processing circuit 158 may be implemented as a processor, such as a Reduced Instruction Set Computing (RISC) processor configured to execute program code, e.g., stored in memory 154. Processing circuit 152 may thus be a RISC Central Processing Unit (CPU) executing program code. The program code may correspond to one or more software and/or firmware control modules, which, when executed by processing circuit 158 may dictate control over first short range radio communication device 101, e.g. in accordance with a Bluetooth protocol stack. Accordingly, such software and/or firmware control modules may provide control logic to dictate the operation of first short range radio communication device 101, e.g., in accordance with a Bluetooth communications specification. References to the operation of first short range radio communication device 101 may refer to actions by processing circuit 158 in response to execution of software and/or firmware control modules.

Clock circuit 156 may be configured to generate a clock, for example, a Bluetooth clock in accordance with Bluetooth communications specifications. The clock may, for example, be based on an electronic oscillator signal, which may have a frequency of 3.2 kHz. The clock may be cyclical and may be implemented by a 28-bit counter. For example, a reference clock may be based on the electronic oscillator signal. Other clocks, for example, a native clock or master piconet clock may be based on the reference clock and include a timing offset. First short range radio communication device 101 (e.g., including processing circuit 158) may use the clock circuit to coordinate communications and other events. Additional temporary clocks for first short range radio communication device 101, e.g., a clock for an additional piconet that first short range radio communication device 101 is connected to, may be based on the clock and may include an offset (e.g., a time offset) from the clock.

Controller 160 may be configured to operate RF transceiver 152. In an aspect of the disclosure, controller 160 may be implemented as part of RF transceiver 152 or may be implemented as part of processing circuit 158. Controller 160 may be implemented partially in RF transceiver 152 and partially in processing circuit 158.

The controller 160 may be configured to operate the RF transceiver 152 in a frequency range in accordance with a first frequency hopping sequence consisting of frequencies in a first segment of the frequency range and a second frequency hopping sequence consisting of frequencies in a second segment of the frequency hopping sequence, wherein the first frequency hopping sequence and the second frequency hopping sequence may be synchronized with the clock circuit 156. For example, controller 160 may keep track of frequency hopping sequences for various networks, e.g., network 200 and network 300, and accordingly control RF transceiver 152, e.g., tuning to the appropriate or scheduled frequency for transmission or reception.

Figure 4:
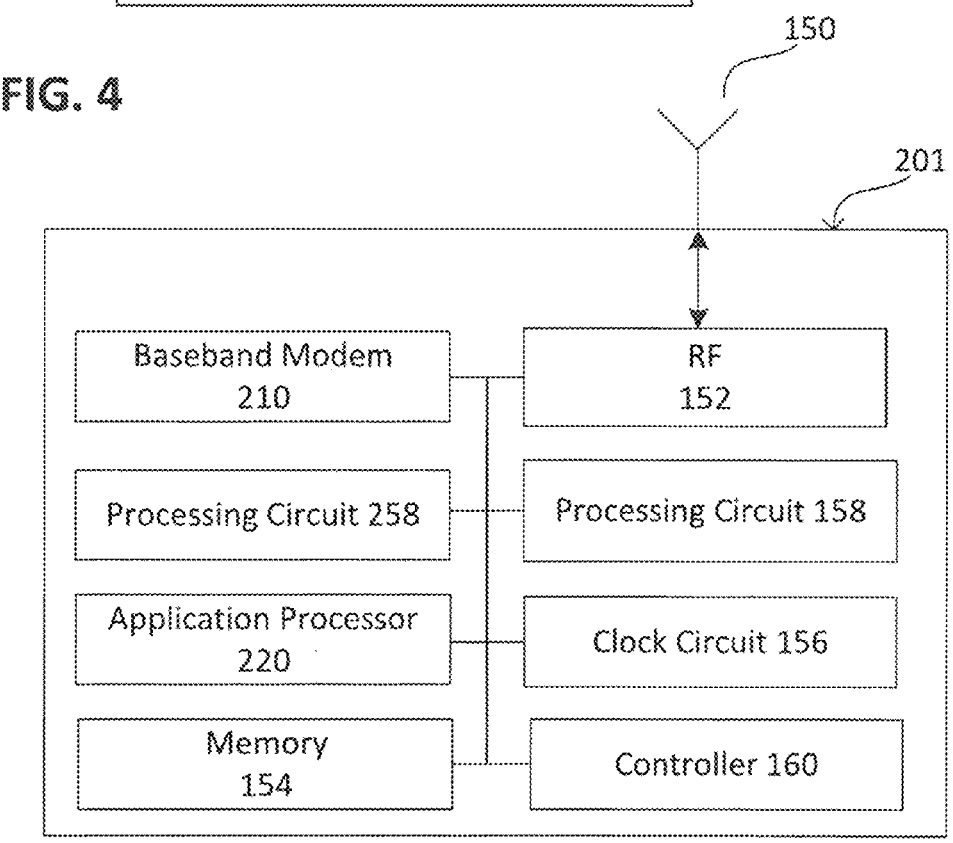
FIG. 4 shows a mobile communications device including a short range radio communications device.

FIG. 4 may show a mobile communications device 201, e.g., a cellular mobile communications device, that may include first short range radio communications device 101 (as discussed above), e.g., as a subsystem, of mobile communications device 201. Mobile communications device 201 may additionally include baseband modem 210, application processor 220, and processing circuit 250, which may form a cellular communications system as appreciated by those skilled in the art. Memory 154 may be common to both systems or may include multiple memory components for each respective communications system or subsystem.

Likewise, RF transceiver 152 may support multiple communication technologies (as will be discussed below) or may include separate RF transceivers for specific communication technologies. Antenna 150, too, may be used for multiple communication technologies or may have dedicated antennas for specific communication technologies.

The cellular communications system may be a Cellular Wide Area radio communication technology, which may include, e.g., a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)).

Mobile communications device 201 may also include other communications technology systems that may not be illustrated here, for example a Metropolitan Area System radio communication technology or additional short range radio communication technologies. Metropolitan Area System radio communication technologies may include, e.g., a Worldwide Interoperability for Microwave Access (WiMax) (e.g., according to an IEEE 802.16 radio communication standard, e.g., WiMax fixed or WiMax mobile), WiPro, HiperMAN (High Performance Radio Metropolitan Area Network) and/or IEEE 802.16m Advanced Air Interface. Short range radio communication technologies may include, e.g., a Bluetooth radio communication technology, an Ultra-Wide Band (UWB) radio communication technology, and/or a Wireless Local Area Network radio communication technology (e.g., according to an IEEE 802.11 (e.g., IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, and IEEE 802.11VHT (VHT=Very High Throughput).

For example, baseband modem 210, which may include mixing circuitry to modulate internally received signals onto one or more radio frequency carrier waves and/or amplification circuitry to amplify internally received signals before transmission. RF transceiver 152 may, for example, provide such signals to antenna 150 for wireless transmission. RF transceiver 152 may be additionally connected to application processor 220.

Application processor 220 may be implemented as a Central Processing Unit (CPU), and may function as a controller for mobile communications device 201. Application processor 220 may be configured to execute various applications and/or programs of mobile communications device 201, such as, e.g., applications corresponding to program code stored in a memory component of mobile communications device 201. Application processor 220 may also be configured to control one or more further components of mobile communications device 201, such as user input/output devices (display(s), keypad(s), touchscreen(s), speaker(s), external button(s), camera(s), microphone(s), etc.), peripheral devices, memory, power supply, external device interfaces, etc.

Although baseband modem 210 and application processor 220 may be depicted separately in FIG. 4, it is appreciated that this illustration is not limiting in nature. Accordingly, it is understood that baseband modem 210 and application processor 220 may be implemented separately, implemented together (i.e., as an integrated unit), or partially implemented together.

As shown in FIG. 5, processing circuit 150 in short range radio communications device 101 and mobile communications device 201 may be configured to perform a method 500 to determine a time offset between an initial starting point of operation of the transceiver, e.g., RF transceiver 152, in accordance with the first frequency hopping sequence and a shifted starting point of the operation of the transceiver in accordance with the first frequency hopping sequence so that the first segment is exclusive of the second segment 510; and control at least one of the controller 160 and the clock circuit 156 to operate the transceiver in accordance with the first frequency hopping sequence at the shifted starting point 520. Method 500 may be implemented via a non-transitory computer readable medium. Accordingly, frequency collisions between the two networks may be avoided.

Processing circuit 158 may control clock circuit 156 to adjust the clock, e.g., adjust the value of the counter representing the clock, or a temporary clock with the controlled time (including the time offset) may be provided to the controller 160.

Figure 6:
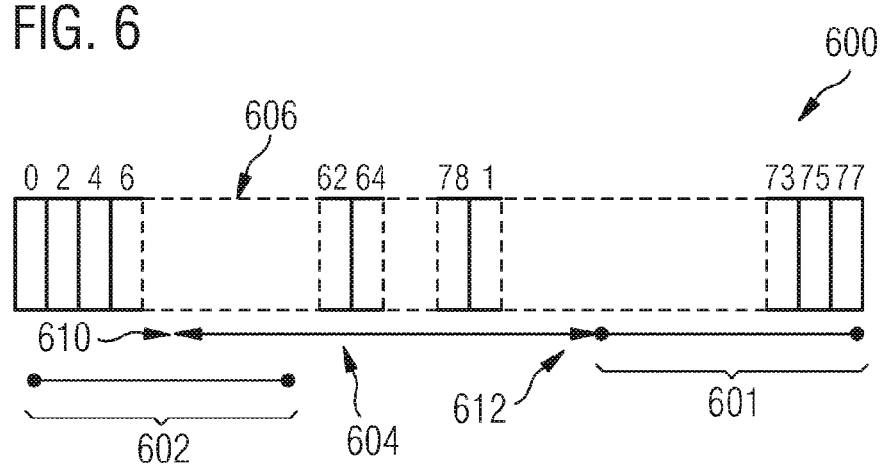
FIG. 6 shows segments for a frequency hopping sequence in a frequency range.

FIG. 6 may illustrate a time offset 604 determined so that first segment 601 is exclusive from second segment 602. The time offset 604 may be at least 625 µs (one time slot) or a multiple of 625 µs, e.g., multiple time slots. As may be shown, first segment 601 and second segment 62 may be within a frequency range 606. Frequency range 606 may include 79 1-MHz frequency channels covering the industrial, scientific, and medical, (ISM) radio band, i.e., 2.4 GHz-2.485 GHz. First segment 601 and second segment 602 may each consist of 32 frequency channels.

The initial starting point 610 may be in a segment of the frequency range that overlaps with the second segment 602. The initial starting point may also be a synchronization time instant wherein the clock circuit 156 (or a clock based on clock circuit 156) is synchronized with a temporary clock for the second frequency hopping sequence, e.g., a native clock of the second short range radio communication device 102. If first segment 601 and second segment 602 overlap, a frequency collision may occur on the first frequency hopping sequence and the second frequency hopping sequence. Time offset 604 may be determined so that the first segment 601 no longer overlaps second segment 602, i.e, so the first frequency hopping sequence is in a completely different (non-overlapping or exclusive) segment of the available frequency channels of the frequency range for the frequency hopping sequences, i.e., the first frequency hopping sequence may be different from the second frequency hopping sequence as the two sequences may be in respectively different segments of the available frequency channels in the frequency range. Accordingly, the shifted starting point 612 may be different from the initial starting point 610. The shifted starting point 612 may be anywhere in first segment 601, but is shown here as the lowest frequency channel in first segment 601. If first segment 601 and second segment 602 are already exclusive, the time offset may be zero. If first segment 601 and second segment 602 are exclusive, frequency collisions between the first frequency hopping sequence and the second frequency hopping sequence may be avoided.

The first frequency hopping sequence may be a frequency hopping spread spectrum according to Bluetooth communications specifications and may apply to network 300, e.g., any short range communication device connected to first short range communication device 101 in a slave role, as well as first short range radio communication device 101. The second frequency hopping sequence may also be a frequency hopping spread spectrum according to Bluetooth communications specifications and may apply to network 200, e.g., any short range communication device connected to second short range communication device 102 in a slave role, as well as second short range radio communication device 102. First short range radio communication device 101 may be part of both networks 200 and 300, and may, thus, maintain both the first frequency hopping sequence and the second frequency hopping sequence.

Figure 7:
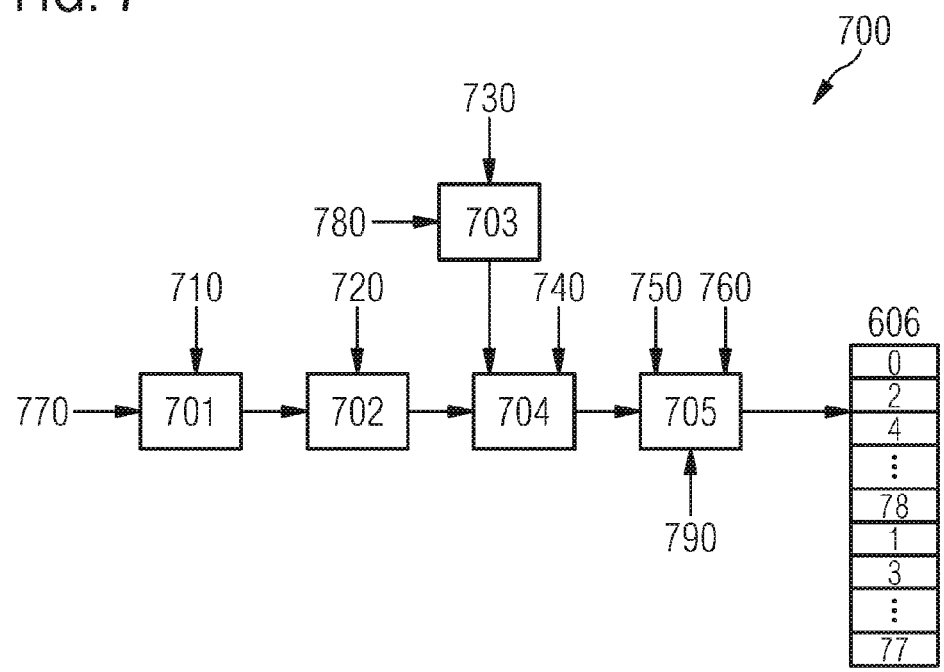
FIG. 7 shows a block diagram of frequency hopping sequence selection.

FIG. 6 may illustrate a short range radio communication device hopping sequence collection kernel 600, e.g., a Bluetooth hopping sequence collection kernel as discussed in Specification of the Bluetooth System Covered Core Package Version 4.2. Reference numerals 710-790 may represent parameters, e.g., in accordance with Bluetooth communications technology, 710 may represent parameter A, 720 may represent parameter B, 730 may represent parameter C, 740 may represent parameter D, 750 may represent parameter F, 760 may represent parameter F, 770 may represent parameter X, 780 may represent parameter Y1, and 790 may represent parameter Y2. 701 may represent an ADD operation, 702 may represent an XOR operation, 703 may represent an XOR operation, 704 may represent a PERM5 permutation operation, and 705 may represent an ADD operation. The parameters X, A, B, C, Y1, C, and D, may determine how to hop within a 32-hop segment and parameters E, F, and Y2, may determine the phase of segment across the 79 1-MHz channels as shown in table 606 and FIG. 7. The parameter F may be based on clock circuit 156 and first short range radio communication device may control clock circuit 156, e.g., by changing the value representing the time of the clock. Accordingly, by controlling the time offset via clock circuit 156 or controller 160, the phase offset of the frequency hopping sequence to the further frequency hopping sequence may be determined.

In an aspect of the disclosure, a frequency hopping sequence may switch frequency channels every two time slots, e.g., every 1.25 ms. In another aspect of the disclosure, a frequency hopping sequence may switch frequency channels for every time slot, e.g., every 625 µs. A master communication time slot, i.e., a time slot wherein a master may transmit, may proceed a slave communication time slot, i.e., a time slot wherein a slave may transmit. If a data packet is to be transmitted in one or more time slots, e.g., a multislot packet, the frequency channel may not change until both the master and slave communications on the frequency are completed. After the master and slave communications, the next frequency channel according to Bluetooth communications specifications may be selected, e.g., which may not be the directly subsequent frequency channel, but may skip one or more frequency channels bypassed during a multislot packet.

A frequency hopping sequence may hop through each frequency channel (unless bypassed by, e.g., a multislot packet) within a segment of the frequency range, e.g., the first frequency hopping sequence may hop through the frequency channels of the first segment 601. Once each frequency channel has been hopped through, the phase of the segment may advance, e.g., by 16 frequency channels, to include a different segment of the frequency range.

In an aspect of the disclosure, the slot available mask feature according to Bluetooth communications specifications may be utilized to reduce time collisions. The slot available mask feature may allow a slave to identify time slots where it is unavailable to communicate with its master, and may be used by a device to avoid conflicts of serving a master role and a slave role at the same time. For example, if first short range radio communication device 101 has a master role in an enhanced synchronous connection-oriented (eSCO) connection with third short range radio communication device 103, while simultaneously serving as a slave to second short range radio communication device 102, first short range radio communication device 101 may communicate to second short range radio communication device 102 that it is not available on certain time slots (due to the eSCO connection). The time slots when first short range radio communication device 101 may be unavailable may be called "reserved" time slots.

Accordingly, the processing circuit 158 may be further configured to: transmit on the second frequency hopping sequence to the master of the network 200 (second short range radio communication device 102) a schedule identifying at least one time slot the first short range radio communication device 101 is scheduled to transmit or receive on the first frequency hopping sequence. For example, the schedule may indicate to second short range radio communication device 102 to exclude the identified time slots from scheduling communications with first short range radio communication device 101.

In another aspect of the disclosure, determining the time offset may take additional factors into consideration. For example, first short range radio communication device 101 may monitor (actively evaluate) communication traffic in network 200, i.e., communications between each slave with the master of network 200 may be monitored. This information may be useful for first short range radio communication device 101 to schedule communications in network 300 and for determining the time offset. Processing circuit 158 may be further configured to determine the time offset so that the shifted starting point is in a time slot synchronized with the clock circuit 156 that the first short range radio communication device 101 is scheduled to transmit on the first frequency hopping sequence and is not scheduled to transmit or receive on the second frequency hopping sequence.

As an example, second short range radio communication device 102 in network 200 may serve in a master role to fourth radio communication device 104 in addition to first radio communication device 101. Fourth short range radio communication device 104 may have an eSCO connection to second short range radio communication device 102, and first short range radio communication device 101 may have an eSCO connection to third short range radio communication device 103. If the two eSCO time slot intervals are the same, it may be beneficial to align the reserved slots to occur at the same time so that first short range radio communication device 101 may not be scheduled to communicate with second short range radio communication device 102 during one of its own eSCO time slot intervals, thus reducing time collisions. In addition, this frees up more time slots for communication between the first short range radio communication device 101 and its master, second short range radio communication device 102.

In an aspect of the disclosure, the entire frequency range may not be available for the first frequency hopping sequence in network 300 or the second frequency hopping range in network 200. First short range radio communication device 101 may determine channel map overlap between the two networks 200 and 300. If network 200 uses most or all of the 79 1-MHz channels, first short range radio communication device 101 will also start with most or all frequency channels, and the time offset may be determined so that first segment 601 and second segment 602 may be exclusive. If network 300 is using a subset (e.g., a minimum of 20 frequency channels) of the frequency range, for example, for adaptive frequency hopping (AFH), it may be possible for first short range radio communication device 101 to also select a subset of the frequency range so that the subsets do not overlap and network 200 and network 300 may operate orthogonally in the frequency domain.

Processing circuit 158 may be further configured to select a first subset of the frequency range to exclude at least one frequency from the first frequency hopping sequence, when the second frequency hopping sequence is based on a second subset of the frequency range, wherein the at least one frequency is in the second subset. However, separating the first subset and the second subset in the frequency range (e.g., separating two AFH channel maps) has lower priority than removing interference channels, so selecting the first subset and the second subset exclusive from one another does not block selection of interference channels for removal from a channel map, e.g., the frequency range. Thus, processing circuit 158 may be further configured to exclude at least one interfered frequency within the frequency range from the first hopping sequence that is subject to interference. The first subset may include frequency channels with an interference level determined by the first short range radio communication device 101 to be below a threshold interference level, e.g., according to AFH in Bluetooth communications specifications.

Figure 8:
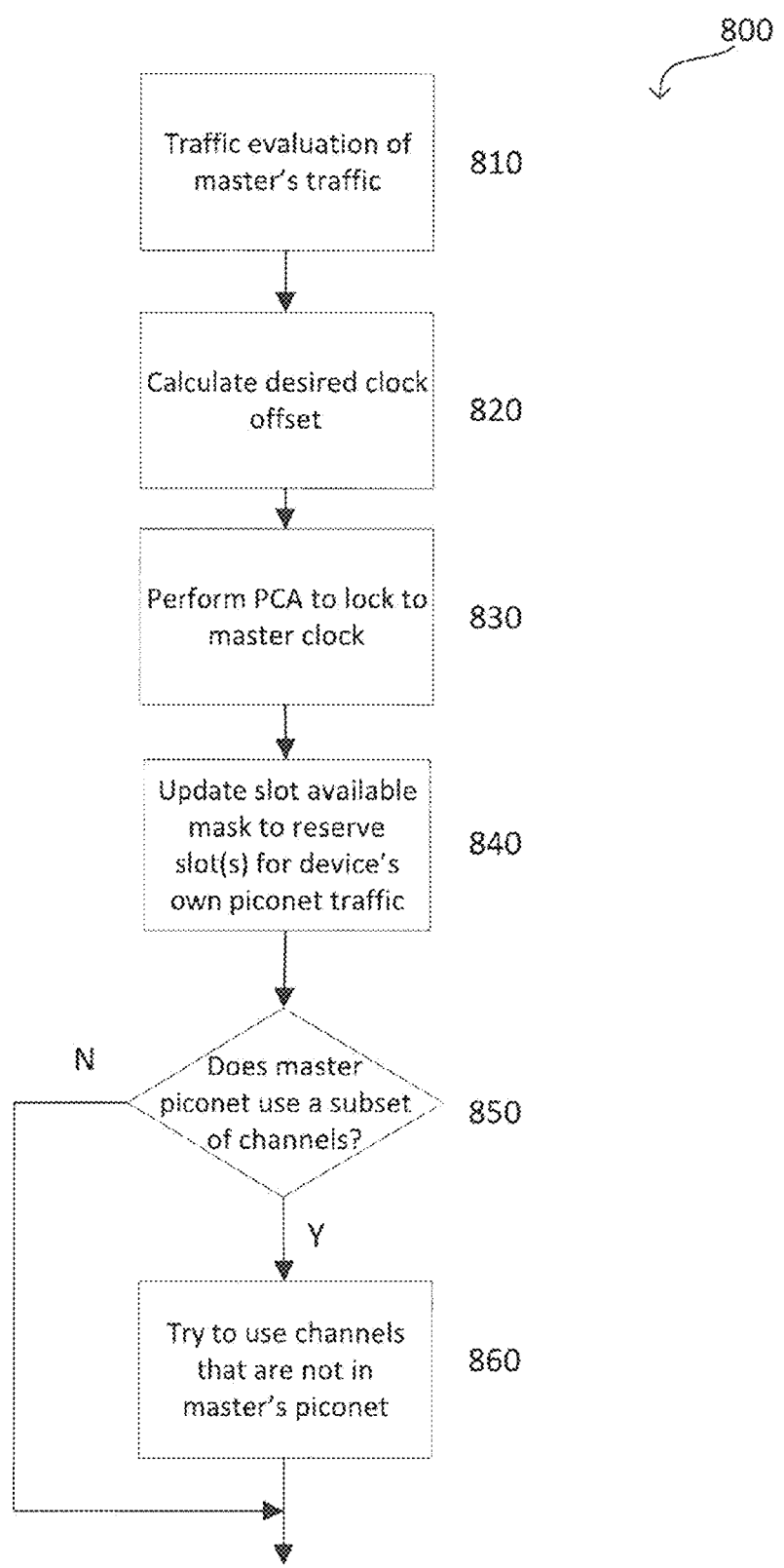
FIG. 8 shows a block diagram of a method of controlling a short range radio communication device.

FIG. 8 may show a flowchart 800 of an exemplary implementation of a method to reduce interference in a scatternet scenario. Method 800 may, for example, be performed by first short range radio communication device 101. Method 800 may be implemented via a non-transitory computer readable medium.

First short range radio communication device 101 may perform traffic evaluation of its master's traffic 810. For example, if network 200 include multiple slaves to second short range radio communication device 102, first short range radio communication device 101 may evaluate when each slave is scheduled to communicate with the master and what types of data may be communicated, e.g., voice data.

A desired clock offset (time offset) 820 may then be determined. The time offset may determine a shifted starting point so the first segment and the second segment do not overlap, i.e., are exclusive, or at least partially exclusive. Aligning certain time slots where first short range radio communication device 101 may be scheduled to communicate with a slave device in network 300 with time slots in network 200 where, e.g., second short range radio communication device 102, may be scheduled to communicate with fourth short range radio communication device 104 may also be taken into account in determining the time offset. The time offset may then be implemented by performing a piconet clock adjustment (PCA) to lock to the master clock (e.g., a clock of second short range radio communication device 102) 830 in accordance with the time offset. Blocks 510 and 520 of method 500 may include blocks 810-830 of method 800.

As discussed above, in block 840, the slot available mask may be updated to reserve any scheduled time slots for first short range radio communication device 101's own piconet traffic (e.g., network 300). Time slots when first short rage radio communication device 101 may thus be communicated to second short range radio communication device 102 so it does not schedule communication time slots at the same time with first short range radio communication device 101.

In blocks 850 and 860, it may be determined if network 200 is using a subset of the frequency range, e.g., to reduce interference by AFH. At block 850, first short range radio communication device 101 may determine if the master piconet uses a subset of channels. If no, no further action may be taken and communications for network 200 and network 300 may continue unchanged. If yes, i.e., if the master piconet is using a subset of channels, first short range radio communication device 101 may select another subset (e.g., a first subset) of frequency channels exclusive to those of the master piconet so that the possibility of frequency collisions may be reduced. However, first short range radio communication device 101's own determination of interference channels has priority over selecting an exclusive subset of channels.

For example, network 200 and network 300 may be spatially proximate so any interference experienced by one network may likely be experienced on the other network. Thus, the master piconet may have already selected a subset of frequency channels that may be, for example, the only frequency channels free from interference. If first short range radio communication device 101 selects exclusive frequency channels, it may only select frequency channels that are subject to interference. Accordingly, the first short range radio communication device may also determine channels subject to interference, the removal of which (or non-selection) for the subset of frequency channels may have precedence over selecting exclusive frequency channels from the master piconet's subset.

In an Example 1 of an aspect of the disclosure, a short range radio communication device may include: a transceiver; a memory; a clock circuit; a controller configured to operate the transceiver in a frequency range in accordance with a first frequency hopping sequence consisting of frequencies in a first segment of the frequency range and a second frequency hopping sequence consisting of frequencies in a second segment of the frequency range, wherein the first frequency hopping sequence and the second frequency hopping sequence are synchronized with the clock circuit, and a processing circuit configured to: determine a time offset between an initial starting point of operation of the transceiver in accordance with the first frequency hopping sequence and a shifted starting point of the operation of the transceiver in accordance with the first frequency hopping sequence so that the first segment is exclusive of the second segment; and control at least one of the controller and the clock circuit to operate the transceiver in accordance with the first frequency hopping sequence at the shifted starting point.

An Example 2 may include the short range radio communication device of Example 1, wherein the shifted starting point is different from the initial starting point.

An Example 3 may include the short range radio communication device of any one of Examples 1 and 2, wherein the frequency range is between 2.4 and 2.485 GHz.

An Example 4 may include the short range radio communication device of any one of Examples 1-3, wherein the frequency range is an industrial, scientific, and medical, (ISM) radio band.

An Example 5 may include the short range radio communication device of any one of Examples 1-4, wherein the frequency range may include 79 1-MHz frequency channels.

An Example 6 may include the short range radio communication device of any one of Examples 1-5, wherein the first segment consists of 32 frequency channels.

An Example 7 may include the short range radio communication device of any one of Examples 1-6, wherein the second segment consists of 32 frequency channels.

An Example 8 may include the short range radio communication device of any one of Examples 6 and 7, wherein each of the frequency channels is separated by 1 MHz.

An Example 9 may include the short range radio communication device of any one of Examples 1-8, wherein the first frequency hopping sequence pseudo-randomly hops between each frequency channel of the first segment.

An Example 10 may include the short range radio communication device of Example 9, wherein the first segment shifts phase within the frequency range after each frequency channel of the first segment is hopped through.

An Example 11 may include the short range radio communication device of any one of Examples 1-10, wherein the second frequency hopping sequence pseudo randomly hops between each frequency channel of the second segment.

An Example 12 may include the short range radio communication device of Example 11, wherein the second segment shifts phase within the frequency range after each frequency channel of the second segment is hopped through.

An Example 13 may include the short range radio communication device of any one of Examples 1-12, wherein the initial starting point is a scheduled frequency channel from the first frequency hopping sequence prior to controlling at least one of the controller and the clock circuit to operate the transceiver in according with the first frequency hopping sequence at the shifted starting point.

An Example 14 may include the short range radio communication device of any one of Examples 1-13, wherein the clock circuit is configured to generate a clock signal.

An Example 15 may include the short range radio communication device of Example 14, wherein the clock signal has a frequency of 3.2 kHz.

An Example 16 may include the short range radio communication device of any one of Examples 14 and 15, wherein the clock circuit maintains at least one clock based on the clock signal.

An Example 17 may include the short range radio communication device of Example 16, wherein the at least one clock is implemented by a counter advanced by the clock signal.

An Example 18 may include the short range radio communication device of Example 17, wherein the counter is a 28-bit counter.

An Example 19 may include the short range radio communication device of any one of Examples 1-18, wherein the processing circuit is further configured to: select a first subset of the frequency range to exclude at least one frequency from the first frequency hopping sequence, when the second frequency hopping sequence is based on a second subset of the frequency range, wherein the at least one frequency is in the second subset.

An Example 20 may include the short range radio communication device of Example 19, wherein the first subset may include at least one orthogonal frequency orthogonal to the at least one frequency in the second subset.

An Example 21 may include the short range radio communication device of any one of Examples 19 and 20, wherein the first subset consists of a minimum of 20 frequency channels.

An Example 22 may include the short range radio communication device of any one of Examples 19-21, wherein the second subset consists of a minimum of 20 frequency channels.

An Example 23 may include the short range radio communication device of any one of Examples 19-22, wherein the processing circuit is further configured to: exclude at least one interfered frequency within the frequency range from the first frequency hopping sequence that is subject to interference.

An Example 24 may include the short range radio communication device of any one of Examples 19-23, wherein the first subset includes frequency channels with an interference level determined by the short range radio communication device to be below a threshold interference level.

An Example 25 may include the short range radio communication device of Example 24, wherein the first subset is selected according to adaptive frequency hopping (AFH).

An Example 26 may include the short range radio communication device of any one of Examples 19-25, wherein the second subset includes frequency channels with an interference level determined for the second frequency hopping sequence to be below a threshold interference level.

An Example 27 may include the short range radio communication device of Example 26, wherein the second subset is selected according to adaptive frequency hopping (AFH).

An Example 28 may include the short range radio communication device of any one of Examples 1-27, wherein the processing circuit is further configured to: determine the time offset so that the shifted starting point is in a time slot synchronized with the clock circuit that the short range radio communication device is scheduled to transmit on the first frequency hopping sequence and is not scheduled to transmit or receive on the second frequency hopping sequence.

An Example 29 may include the short range radio communication device of Example 28, wherein the processing circuit is further configured to: transmit on the second frequency hopping sequence a schedule identifying at least one time slot the short range radio communications device is scheduled to transmit or receive on the first frequency hopping sequence.

An Example 30 may include the short range radio communication device of any one of Examples 1-29, wherein the short range radio communication device is configured to use the first frequency hopping sequence in a first network may include a slave short range radio communication device and the short range radio communication device; and wherein the short range radio communication device is configured to use the second frequency hopping sequence in a second network may include a master short range radio communication device and the short range radio communication device.

An Example 31 may include the short range radio communication device of Example 30, wherein the short range radio communication device is a master in the first network.

An Example 32 may include the short range radio communication device of any one of Examples 30 and 31, wherein the short range radio communication device is a slave to the master short range radio communication device in the second network.

An Example 33 may include the short range radio communication device of any one of Examples 30-32, wherein the short range radio communication device and the slave short range radio communication device schedule communications by time-division duplexing (TDD).

An Example 34 may include the short range radio communication device of any one of Examples 30-33, wherein the short range radio communication device and the master short range radio communication device schedule communications by time-division duplexing (TDD).

An Example 35 may include the short range radio communication device of any one of Examples 30-34, wherein the first network is a Bluetooth piconet.

An Example 36 may include the short range radio communication device of any one of Examples 30-35, wherein the second network is a Bluetooth piconet.

An Example 37 may include the short range radio communication device of any one of Examples 1-36, wherein the short range radio communication device is in a scatternet scenario.

An Example 38 may include the short range radio communication device of any one of Examples 1-37, wherein the short range radio communication device is a Bluetooth device.

An Example 39 may include the short range radio communication device of any one of Examples 1-39, wherein the time offset is at least 625 µs.

An Example 40 may include the short range radio communication device of any one of Examples 1-40, wherein the time offset is a multiple of 625 µs.

An Example 41 may include the short range radio communication device of any one of Examples 1-40, wherein the time offset is at least one time slot.

An Example 42 may include the short range radio communication device of any one of Examples 1-42, wherein the time offset is a multiple of one time slot.

An Example 43 may include the short range radio communication device of any one of Examples 1-42, further may include: an antenna.

An Example 44 may include the short range radio communication device of Example 43, wherein the antenna is an antenna array.

In an Example 45 of an aspect of the disclosure, a mobile communications device may include the short range radio communication device according to any one of Examples 1-44.

An Example 46 may include the mobile communications device of Example 45, wherein the short range radio communications device is a subsystem of the mobile communications device.

An Example 47 may include the mobile communications device of any one of Examples 45 and 46, further may include: a cellular wide area communications subsystem.

An Example 48 may include the mobile communications device of any one of Examples 45-47, further may include: a metropolitan area system communications subsystem.

An Example 49 may include the mobile communications device of any one of Examples 45-48, further may include: an additional short range radio communications subsystem.

An Example 50 may include the mobile communications device of any one of Examples 45-49, further may include: a wireless local area network subsystem.

In an Example 51 of an aspect of the disclosure, a method for controlling a short range radio communication device may include a controller configured to operate a transceiver in a frequency range in accordance with a first frequency hopping sequence consisting of frequencies in a first segment of the frequency range and a second frequency hopping sequence consisting of frequencies in a second segment of the frequency range, wherein the first frequency hopping sequence and the second frequency hopping sequence are synchronized with a clock circuit, the method may include: determining a time offset between an initial starting point of operation of the transceiver in accordance with the first frequency hopping sequence and a shifted starting point of the operation of the transceiver in accordance with the first frequency hopping sequence so that the first segment is exclusive of the second segment; and controlling at least one of the controller and the clock circuit to operate the transceiver in accordance with the first frequency hopping sequence at the shifted starting point.

An Example 52 may include the method of Example 51, wherein the shifted starting point is different from the initial starting point.

An Example 53 may include the method of any one of Examples 51 and 52, wherein the frequency range is between 2.4 and 2.485 GHz.

An Example 54 may include the method of any one of Examples 51-53, wherein the frequency range is an industrial, scientific, and medical, (ISM) radio band.

An Example 55 may include the method of any one of Examples 51-54, wherein the frequency range may include 79 1-MHz frequency channels.

An Example 56 may include the method of any one of Examples 51-55, wherein the first segment consists of 32 frequency channels.

An Example 57 may include the method of any one of Examples 51-56, wherein the second segment consists of 32 frequency channels.

An Example 58 may include the method of any one of Examples 56 and 57, wherein each of the frequency channels is separated by 1 MHz.

An Example 59 may include the method of any one of Examples 51-58, wherein the first frequency hopping sequence pseudo-randomly hops between each frequency channel of the first segment.

An Example 60 may include the method of Example 59, wherein the first segment shifts phase within the frequency range after each frequency channel of the first segment is hopped through.

An Example 61 may include the method of any one of Examples 51-60, wherein the second frequency hopping sequence pseudo randomly hops between each frequency channel of the second segment.

An Example 62 may include the method of Example 61, wherein the second segment shifts phase within the frequency range after each frequency channel of the second segment is hopped through.

An Example 63 may include the method of any one of Examples 51-62, wherein the initial starting point is a scheduled frequency channel from the first frequency hopping sequence prior to controlling at least one of the controller and the clock circuit to operate the transceiver in according with the first frequency hopping sequence at the shifted starting point.

An Example 64 may include the method of any one of Examples 51-63, wherein the clock circuit is configured to generate a clock signal.

An Example 65 may include the method of Example 64, wherein the clock signal has a frequency of 3.2 kHz.

An Example 66 may include the method of any one of Examples 64 and 65, wherein the clock circuit maintains at least one clock based on the clock signal.

An Example 67 may include the method of Example 66, wherein the at least one clock is implemented by a counter advanced by the clock signal.

An Example 68 may include the method of Example 67, wherein the counter is a 28-bit counter.

An Example 69 may include the method of any one of Examples 51-68, further may include: selecting a first subset of the frequency range to exclude at least one frequency from the first frequency hopping sequence, when the second frequency hopping sequence is based on a second subset of the frequency range, wherein the at least one frequency is in the second subset.

An Example 70 may include the method of Example 69, wherein the first subset may include at least one orthogonal frequency orthogonal to the at least one frequency in the second subset.

An Example 71 may include the method of any one of Examples 69 and 70, wherein the first subset consists of a minimum of 20 frequency channels.

An Example 72 may include the method of any one of Examples 69-71, wherein the second subset consists of a minimum of 20 frequency channels.

An Example 73 may include the method of any one of Examples 66-72, further may include: excluding at least one interfered frequency within the frequency range from the first frequency hopping sequence that is subject to interference.

An Example 74 may include the method of any one of Examples 69-73, wherein the first subset includes frequency channels with an interference level determined by the short range radio communication device to be below a threshold interference level.

An Example 75 may include the method of Example 74, wherein the first subset is selected according to adaptive frequency hopping (AFH).

An Example 76 may include the method of any one of Examples 69-75, wherein the second subset includes frequency channels with an interference level determined for the second frequency hopping sequence to be below a threshold interference level.

An Example 77 may include the method of Example 76, wherein the second subset is selected according to adaptive frequency hopping (AFH).

An Example 78 may include the method of any one of Examples 51-77, further may include: determining the time offset so that the shifted starting point is in a time slot synchronized with the clock circuit that the short range radio communication device is scheduled to transmit on the first frequency hopping sequence and is not scheduled to transmit or receive on the second frequency hopping sequence.

An Example 79 may include the method of any one of Examples 51-78, further may include: transmitting on the second frequency hopping sequence a schedule identifying at least one time slot the short range radio communications device is scheduled to transmit or receive on the first frequency hopping sequence.

An Example 80 may include the method of any one of Examples 51-79, wherein the short range radio communication device is configured to use the first frequency hopping sequence in a first network may include a slave short range radio communication device and the short range radio communication device; and wherein the short range radio communication device is configured to use the second frequency hopping sequence in a second network may include a master short range radio communication device and the short range radio communication device.

An Example 81 may include the method of Example 80, wherein the short range radio communication device is a master in the first network.

An Example 82 may include the method of any one of Examples 80 and 81, wherein the short range radio communication device is a slave to the master short range radio communication device in the second network.

An Example 83 may include the method of any one of Examples 80-82, wherein the short range radio communication device and the slave short range radio communication device schedule communications by time-division duplexing (TDD).

An Example 84 may include the method of any one of Examples 80-83, wherein the short range radio communication device and the master short range radio communication device schedule communications by time-division duplexing (TDD).

An Example 85 may include the method of any one of Examples 80-84, wherein the first network is a Bluetooth piconet.

An Example 86 may include the method of any one of Examples 80-85, wherein the second network is a Bluetooth piconet.

An Example 87 may include the method of any one of Examples 51-86, wherein the short range radio communication device is in a scatternet scenario.

An Example 88 may include the method of any one of Examples 51-87, wherein the short range radio communication device is a Bluetooth device.

An Example 89 may include the method of any one of Examples 51-88, wherein the time offset is at least 625 µs.

An Example 90 may include the method of any one of Examples 51-89, wherein the time offset is a multiple of 625 µs.

An Example 91 may include the method of any one of Examples 51-90, wherein the time offset is at least one time slot.

An Example 92 may include the method of any one of Examples 51-91, wherein the time offset is a multiple of one time slot.

An Example 93 may include the method of any one of Examples 51-92, wherein the short range radio communication device further may include: an antenna.

An Example 94 may include the method of Example 93, wherein the antenna is an antenna array.

In an Example 95 of an aspect of the disclosure, a non-transitory computer readable medium having computer-executable instructions that cause a processing circuit of a short range radio communication device to perform a method, wherein the processing circuit is coupled with a controller configured to operate a transceiver in a frequency range in accordance with a first frequency hopping sequence consisting of frequencies in a first segment of the frequency range and a second frequency hopping sequence consisting of frequencies in a second segment of the frequency range, wherein the first frequency hopping sequence and the second frequency hopping sequence are synchronized with a clock circuit, the method may include: determining a time offset between an initial starting point of operation of a transceiver in accordance with a first frequency hopping sequence and a shifted starting point of the operation of the transceiver in accordance with the first frequency hopping sequence so that the first segment is exclusive of the second segment; and controlling at least one of the controller and the clock circuit to operate the transceiver in accordance with the first frequency hopping sequence at the shifted starting point.

An Example 96 may include the non-transitory computer readable medium of Example 95, wherein the shifted starting point is different from the initial starting point.

An Example 97 may include the non-transitory computer readable medium of any one of Examples 95 and 96, wherein the frequency range is between 2.4 and 2.485 GHz.

An Example 98 may include the non-transitory computer readable medium of any one of Examples 95-97, wherein the frequency range is an industrial, scientific, and medical, (ISM) radio band.

An Example 99 may include the non-transitory computer readable medium of any one of Examples 95-98, wherein the frequency range may include 79 1-MHz frequency channels.

An Example 100 may include the non-transitory computer readable medium of any one of Examples 95-99, wherein the first segment consists of 32 frequency channels.

An Example 101 may include the non-transitory computer readable medium of any one of Examples 95-100, wherein the second segment consists of 32 frequency channels.

An Example 102 may include the non-transitory computer readable medium of any one of Examples 100 and 101, wherein each of the frequency channels is separated by 1 MHz.

An Example 103 may include the non-transitory computer readable medium of any one of Examples 95-102, wherein the first frequency hopping sequence pseudo-randomly hops between each frequency channel of the first segment.

An Example 104 may include the non-transitory computer readable medium of Example 103, wherein the first segment shifts phase within the frequency range after each frequency channel of the first segment is hopped through.

An Example 105 may include the non-transitory computer readable medium of any one of Examples 95-104, wherein the second frequency hopping sequence pseudo randomly hops between each frequency channel of the second segment.

An Example 106 may include the non-transitory computer readable medium of Example 105, wherein the second segment shifts phase within the frequency range after each frequency channel of the second segment is hopped through.

An Example 107 may include the non-transitory computer readable medium of any one of Examples 95-106, wherein the initial starting point is a scheduled frequency channel from the first frequency hopping sequence prior to controlling at least one of the controller and the clock circuit to operate the transceiver in according with the first frequency hopping sequence at the shifted starting point.

An Example 108 may include the non-transitory computer readable medium of any one of Examples 95-107, wherein the clock circuit is configured to generate a clock signal.

An Example 109 may include the non-transitory computer readable medium of Example 108, wherein the clock signal has a frequency of 3.2 kHz.

An Example 110 may include the non-transitory computer readable medium of any one of Examples 108 and 109, wherein the clock circuit maintains at least one clock based on the clock signal.

An Example 111 may include the non-transitory computer readable medium of Example 110, wherein the at least one clock is implemented by a counter advanced by the clock signal.

An Example 112 may include the non-transitory computer readable medium of Example 111, wherein the counter is a 28-bit counter.

An Example 113 may include the non-transitory computer readable medium of any one of Examples 95-112, further may include: selecting a first subset of the frequency range to exclude at least one frequency from the first frequency hopping sequence, when the second frequency hopping sequence is based on a second subset of the frequency range, wherein the at least one frequency is in the second subset.

An Example 114 may include the non-transitory computer readable medium of Example 113, wherein the first subset may include at least one orthogonal frequency orthogonal to the at least one frequency in the second subset.

An Example 115 may include the non-transitory computer readable medium of any one of Examples 113 and 114, wherein the first subset consists of a minimum of 20 frequency channels.

An Example 116 may include the non-transitory computer readable medium of any one of Examples 113-115, wherein the second subset consists of a minimum of 20 frequency channels.

An Example 117 may include the non-transitory computer readable medium of any one of Examples 110-116, further may include: excluding at least one interfered frequency within the frequency range from the first frequency hopping sequence that is subject to interference.

An Example 118 may include the non-transitory computer readable medium of any one of Examples 113-117, wherein the first subset includes frequency channels with an interference level determined by the short range radio communication device to be below a threshold interference level.

An Example 119 may include the non-transitory computer readable medium of Example 118, wherein the first subset is selected according to adaptive frequency hopping (AFH).

An Example 120 may include the non-transitory computer readable medium of any one of Examples 114-119, wherein the second subset includes frequency channels with an interference level determined for the second frequency hopping sequence to be below a threshold interference level.

An Example 121 may include the non-transitory computer readable medium of Example 120, wherein the second subset is selected according to adaptive frequency hopping (AFH).

An Example 122 may include the non-transitory computer readable medium of any one of Examples 95-121, further may include: determining the time offset so that the shifted starting point is in a time slot synchronized with the clock circuit that the short range radio communication device is scheduled to transmit on the first frequency hopping sequence and is not scheduled to transmit or receive on the second frequency hopping sequence.

An Example 123 may include the non-transitory computer readable medium of any one of Examples 95-122, further may include: transmitting on the second frequency hopping sequence a schedule identifying at least one time slot the short range radio communications device is scheduled to transmit or receive on the first frequency hopping sequence.

An Example 124 may include the non-transitory computer readable medium of any one of Examples 95-123, wherein the short range radio communication device is configured to use the first frequency hopping sequence in a first network may include a slave short range radio communication device and the short range radio communication device; and wherein the short range radio communication device is configured to use the second frequency hopping sequence in a second network may include a master short range radio communication device and the short range radio communication device.

An Example 125 may include the non-transitory computer readable medium of Example 124, wherein the short range radio communication device is a master in the first network.

An Example 126 may include the non-transitory computer readable medium of any one of Examples 124 and 125, wherein the short range radio communication device is a slave to the master short range radio communication device in the second network.

An Example 127 may include the non-transitory computer readable medium of any one of Examples 124-126, wherein the short range radio communication device and the slave short range radio communication device schedule communications by time-division duplexing (TDD).

An Example 128 may include the non-transitory computer readable medium of any one of Examples 124-127, wherein the short range radio communication device and the master short range radio communication device schedule communications by time-division duplexing (TDD).

An Example 129 may include the non-transitory computer readable medium of any one of Examples 124-128, wherein the first network is a Bluetooth piconet.

An Example 130 may include the non-transitory computer readable medium of any one of Examples 124-129, wherein the second network is a Bluetooth piconet.

An Example 131 may include the non-transitory computer readable medium of any one of Examples 95-130, wherein the short range radio communication device is in a scatternet scenario.

An Example 132 may include the non-transitory computer readable medium of any one of Examples 95-131, wherein the short range radio communication device is a Bluetooth device.

An Example 133 may include the non-transitory computer readable medium of any one of Examples 95-132, wherein the time offset is at least 625 µs.

An Example 134 may include the non-transitory computer readable medium of any one of Examples 95-133, wherein the time offset is a multiple of 625 µs.

An Example 135 may include the non-transitory computer readable medium of any one of Examples 95-134, wherein the time offset is at least one time slot.

An Example 136 may include the non-transitory computer readable medium of any one of Examples 95-135, wherein the time offset is a multiple of one time slot.

An Example 137 may include the non-transitory computer readable medium of any one of Examples 95-136, wherein the short range radio communication device further may include: an antenna.

An Example 138 may include the non-transitory computer readable medium of Example 137, wherein the antenna is an antenna array.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A short range radio communication device comprising:
a transceiver;
a clock circuit;
a controller configured to operate the transceiver in a frequency range in accordance with a first frequency hopping sequence consisting of frequencies in a first segment of the frequency range and a second frequency hopping sequence consisting of frequencies in a second segment of the frequency range, wherein the first frequency hopping sequence and the second frequency hopping sequence are synchronized with the clock circuit, and
a processing circuit configured to:
determine a time offset between an initial starting point of operation of the transceiver in accordance with the first frequency hopping sequence and a shifted starting point of the operation of the transceiver in accordance with the first frequency hopping sequence so that the first segment is exclusive of the second segment; and
control at least one of the controller and the clock circuit to operate the transceiver in accordance with the first frequency hopping sequence at the shifted starting point.

2. The short range radio communication device of claim 1,
wherein the shifted starting point is different from the initial starting point.

3. The short range radio communication device of claim 1,
wherein the processing circuit is further configured to exclude at least one interfered frequency within the frequency range from the first frequency hopping sequence that is subject to interference.

4. The short range radio communication device of claim 1,
wherein the processing circuit is further configured to select a first subset of the frequency range to exclude at least one frequency from the first frequency hopping sequence, when the second frequency hopping sequence is based on a second subset of the frequency range, wherein the at least one frequency is in the second subset.

5. The short range radio communication device of claim 4,
wherein the first subset comprises at least one orthogonal frequency orthogonal to the at least one frequency in the second subset.

6. The short range radio communication device of claim 1,
wherein the processing circuit is further configured to determine the time offset so that the shifted starting point is in a time slot synchronized with the clock circuit that the short range radio communication device is scheduled to transmit on the first frequency hopping sequence and is not scheduled to transmit or receive on the second frequency hopping sequence.

7. The short range radio communication device of claim 1,
wherein the processing circuit is further configured to transmit on the second frequency hopping sequence a schedule identifying at least one time slot the short range radio communications device is scheduled to transmit or receive on the first frequency hopping sequence.

8. The short range radio communication device of claim 1,
wherein the short range radio communication device is configured to use the first frequency hopping sequence in a first network comprising a slave short range radio communication device and the short range radio communication device; and
wherein the short range radio communication device is configured to use the second frequency hopping sequence in a second network comprising a master short range radio communication device and the short range radio communication device.

9. The short range radio communication device of claim 8,
wherein the short range radio communication device is a master in the first network.

10. The short range radio communication device of claim 8,
wherein the short range radio communication device is a slave to the master short range radio communication device in the second network.

11. The short range radio communication device of claim 1,
wherein the short range radio communication device is a Bluetooth device.

12. The short range radio communication device of claim 1,
wherein the time offset is a multiple of 625 µs.

13. A method for controlling a short range radio communication device, the method comprising:
operating a transceiver in a frequency range in accordance with a first frequency hopping sequence consisting of frequencies in a first segment of the frequency range and a second frequency hopping sequence consisting of frequencies in a second segment of the frequency range, wherein the first frequency hopping sequence and the second frequency hopping sequence are synchronized with a clock circuit, determining a time offset, by a processing circuit, between an initial starting point of operation of the transceiver in accordance with the first frequency hopping sequence and a shifted starting point of the operation of the transceiver in accordance with the first frequency hopping sequence so that the first segment is exclusive of the second segment; and
controlling, by the processing circuit, at least one of the controller and the clock circuit to operate the transceiver in accordance with the first frequency hopping sequence at the shifted starting point.

14. The method of claim 13,
wherein the shifted starting point is different from the initial starting point.

15. The method of claim 13, further comprising:
excluding at least one interfered frequency within the frequency range from the first frequency hopping sequence that is subject to interference.

16. The method of claim 15, further comprising:
selecting a first subset of the frequency range to exclude at least one frequency from the first frequency hopping sequence, when the second frequency hopping sequence is based on a second subset of the frequency range, wherein the at least one frequency is in the second subset.

17. The method of claim 13, further comprising:
determining the time offset so that the shifted starting point is in a time slot synchronized with the clock circuit that the short range radio communication device is scheduled to transmit on the first frequency hopping sequence and is not scheduled to transmit or receive on the second frequency hopping sequence.

18. The method of claim 13, further comprising:
transmitting on the second frequency hopping sequence a schedule identifying at least one time slot the short range radio communications device is scheduled to transmit or receive on the first frequency hopping sequence.

19. A non-transitory computer readable medium having computer-executable instructions that cause a processing circuit to perform a method, wherein the processing circuit is coupled with a controller configured to operate a transceiver in a frequency range in accordance with a first frequency hopping sequence consisting of frequencies in a first segment of the frequency range and a second frequency hopping sequence consisting of frequencies in a second segment of the frequency range, wherein the first frequency hopping sequence and the second frequency hopping sequence are synchronized with a clock circuit, the method comprising:
determining a time offset between an initial starting point of operation of a transceiver in accordance with a first frequency hopping sequence and a shifted starting point of the operation of the transceiver in accordance with the first frequency hopping sequence so that the first segment is exclusive of the second segment; and
controlling at least one of the controller and the clock circuit to operate the transceiver in accordance with the first frequency hopping sequence at the shifted starting point.

20. The non-transitory computer readable medium of claim 19,
wherein the shifted starting point is different from the initial starting point.

* * * * *